(12) United States Patent
Hanabusa (10) Patent No.: US 8,044,855 B2
(45) Date of Patent: Oct. 25, 2011

(54) GPS RECEIVER APPARATUS AND INFORMATION ACQUISITION METHOD THEREOF

(75) Inventor: Toshio Hanabusa, Kawasaki (JP)

(73) Assignee: Casio Computer Co., Ltd., Tokyo (JP)

( * ) Notice: Subject to any disclaimer, the term of this patent is extended or adjusted under 35 U.S.C. 154(b) by 225 days.

(21) Appl. No.: 12/473,403

(22) Filed: May 28, 2009

(65) Prior Publication Data
US 2009/0309792 A1 Dec. 17, 2009

(30) Foreign Application Priority Data

Jun. 13, 2008 (JP) ................................ 2008-155519

(51) Int. Cl.
*G01S 19/34* (2010.01)
*G01S 19/24* (2010.01)

(52) U.S. Cl. ............................... 342/357.74; 342/357.63

(58) Field of Classification Search ............ 342/357.06, 342/357.63, 357.74
See application file for complete search history.

(56) References Cited

U.S. PATENT DOCUMENTS

| | | | | |
|---|---|---|---|---|
| 5,097,488 A | * | 3/1992 | Kokubo et al. | 375/354 |
| 5,691,974 A | * | 11/1997 | Zehavi et al. | 370/203 |
| 6,121,923 A | * | 9/2000 | King | 342/357.42 |
| 6,346,911 B1 | * | 2/2002 | King | 342/357.62 |
| 6,380,891 B1 | * | 4/2002 | Yamashita | 342/357.58 |
| 2010/0039316 A1 | * | 2/2010 | Gronemeyer et al. | 342/357.06 |
| 2010/0283680 A1 | * | 11/2010 | Vishin et al. | 342/357.63 |

FOREIGN PATENT DOCUMENTS

| | | | |
|---|---|---|---|
| JP | 10-082875 | * | 3/1998 |
| JP | 2003-248043 | | 9/2003 |
| JP | 2003-248043 A | * | 9/2003 |
| JP | 2007-263598 | | 10/2007 |
| JP | 2008-032637 | | 2/2008 |
| JP | 2008-032637 A | * | 2/2008 |

OTHER PUBLICATIONS

Japanese Office Action for 2008-155519 mailed on Nov. 16, 2010.
Japanese Office Action for 2008-155519 mailed on Apr. 27, 2010.

* cited by examiner

*Primary Examiner* — Thomas Tarcza
*Assistant Examiner* — Frank McGue
(74) *Attorney, Agent, or Firm* — Turocy & Watson, LLP (57) ABSTRACT

The first reception operation is started in response to an acquisition request. Power supply to a RF unit and a demodulator is stopped after synchronization with the GPS signal is established. Based on information acquired from a sub-frame in the GPS signal, a time point to start the second reception operation is determined. Elapsed time is counted using a counter clock synchronized with transmission timing of the navigation message, while a reception frequency of the satellite, a PRN code unique to the satellite, and a frequency and a phase of the PRN code are retained. When the elapsed time arrives at the time point, the power supply to the RF unit and the demodulator is restarted.

6 Claims, 7 Drawing Sheets

| BLOCK | | MODE | GPS - ON | | | GPS WAITING | GPS - OFF |
|---|---|---|---|---|---|---|---|
| | | | RECEPTION | ARITHMETIC PROCESSING | RECEPTION WAITING | | |
| RF UNIT | | | ON | OFF | OFF | OFF | OFF |
| BASEBAND UNIT | FIRST RECEPTION PROCESSOR | DEMODULATOR | ON | OFF | OFF | OFF | OFF |
| | | CLOCK GENERATION AND SYNCHRONIZATION DETECTION UNIT | ON | ON | ON | OFF | OFF |
| | SECOND RECEPTION PROCESSOR | DEMODULATOR | OFF/ON | OFF | OFF | OFF | OFF |
| | | CLOCK GENERATION AND SYNCHRONIZATION DETECTION UNIT | OFF/ON | OFF/ON | OFF/ON | OFF | OFF |
| | ARITHMETIC PROCESSOR | | ON | ON | OFF | OFF | OFF |
| | CONTROLLER | | ON | ON | ON | ON | OFF |
| | CLOCK UNIT | | ON | ON | ON | ON | ON |

| BLOCK | | MODE | GPS - ON | | | GPS WAITING | GPS - OFF |
|---|---|---|---|---|---|---|---|
| | | | RECEPTION | ARITHMETIC PROCESSING | RECEPTION WAITING | | |
| RF UNIT | | | ON | OFF | OFF | OFF | OFF |
| BASEBAND UNIT | FIRST RECEPTION PROCESSOR | DEMODULATOR | ON | OFF | OFF | OFF | OFF |
| | | CLOCK GENERATION AND SYNCHRONIZATION DETECTION UNIT | ON | ON | ON | OFF | OFF |
| | SECOND RECEPTION PROCESSOR | DEMODULATOR | OFF/ON | OFF | OFF | OFF | OFF |
| | | CLOCK GENERATION AND SYNCHRONIZATION DETECTION UNIT | OFF/ON | OFF/ON | OFF/ON | OFF | OFF |
| | ARITHMETIC PROCESSOR | | ON | ON | OFF | OFF | OFF |
| | CONTROLLER | | ON | ON | ON | ON | OFF |
| CLOCK UNIT | | | ON | ON | ON | ON | ON |

FIG.5

FIG.6A
PRIOR ART
FRAME STRUCTURE

FIG.6B
PRIOR ART
SUB-FRAME STRUCTURE

FIG.7
PRIOR ART

GPS RECEIVER APPARATUS AND INFORMATION ACQUISITION METHOD THEREOF

CROSS-REFERENCE TO RELATED APPLICATIONS

This application is based upon and claims the benefit of priority from prior Japanese Patent Application No. 2008-155519, filed Jun. 13, 2008, the entire contents of which are incorporated herein by reference.

BACKGROUND OF THE INVENTION

1. Field of the Invention

The present invention relates to a GPS receiver apparatus which acquires specific information from a GPS signal and information acquisition method thereof.

2. Description of the Related Art

A GPS receiver apparatus which utilizes the global positioning system (GPS) receives radio waves sent from satellites and measures a current position of the apparatus. Currently, various types of GPS receiver apparatus are used depending on the intended purposes. The GPS receiver apparatus captures and tracks a plurality of satellites (four or more satellites in general) and acquires the whole navigation message sent from the satellites to calculate a position of the receiver apparatus at high speed and with high accuracy.

Figure 6A:
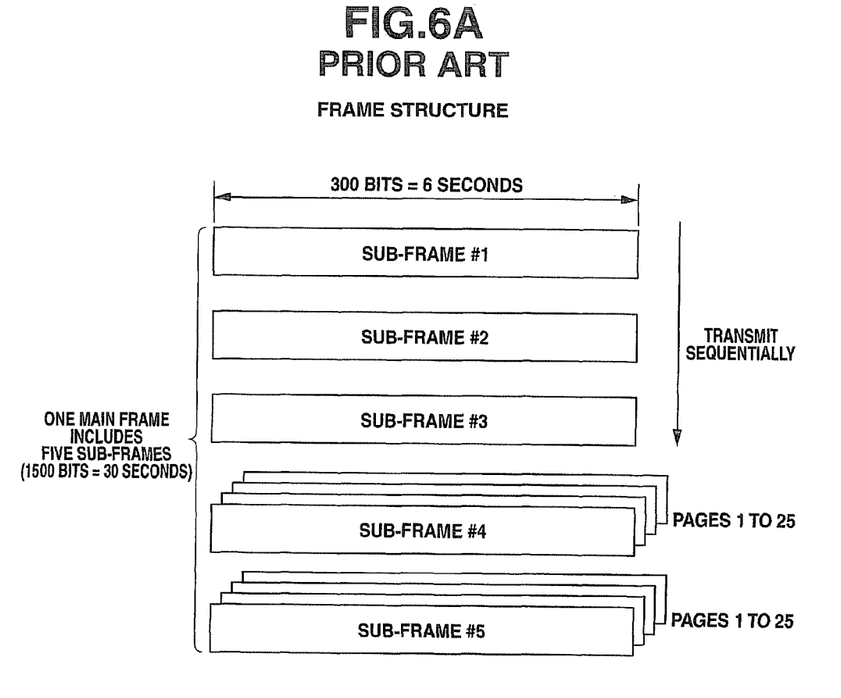
FIGS. 6A and 6B are views schematically showing a data structure of a navigation message.
Figure 6B:
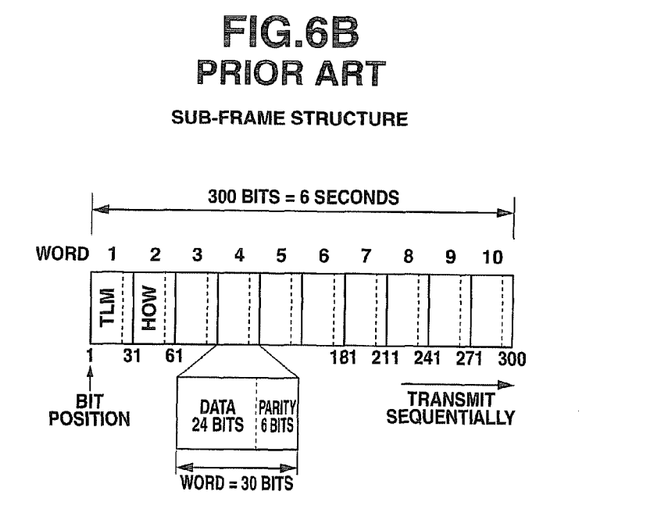

As shown in FIGS. 6A and 6B, the navigation message has a hierarchical structure that includes 25 main frames each of which includes 5 sub-frames. Each of the sub-frames includes 10 words. The main frames are sent every 30 seconds, the sub-frames are sent every 6 seconds, and the words are sent every 0.6 seconds. As a master frame, 25 main frames are sent every 12.5 minutes. The second word in each of the sub-frames contains data referred to as a hand over word (HOW), and the HOW includes accurate time information provided by the GPS satellites, i.e., time of week (TOW) that is a value expressed in units of 6 seconds beginning at 00:00:00 on every Sunday. Therefore, usage of the time information allows current clock time held by a clock circuit contained in the GPS receiver apparatus or any equipment including the GPS receiver apparatus to be accurately corrected.

For example, Jpn. Pat. Appln. KOKAI Publication No. 2007-263598 discloses a technique to reduce power consumption required for time correction in a GPS receiver apparatus having a display function. According to this technique, when correcting a clock time once a day, the GPS receiver apparatus firstly starts supplying power to a tuner circuit and a signal processing circuit, the former of which receives radio waves from GPS satellites via an antenna, and the latter of which decodes reception signals contained in the received radio waves in parallel and detects a navigation message. When the time correction operation is completed, the power supply to the tuner circuit and the signal processing circuit is immediately terminated.

The above-described navigation message includes not only the time information in the sub-frames but also date information in the first sub-frame. That is, the third word in the first sub-frame contains data referred to as a week number (WN) (see FIG. 7). Described in the WN word is the number of weeks past from the week starting from 00:00:00, Jan. 6, 1980, where a week number of this week is set to "0". Therefore, when the GPS receiver apparatus has a calendar function, the current date can be automatically set (or corrected) using the date information, as required by a user at the time of firstly starting usage of the apparatus or at the time of initializing the apparatus.

The HOW is contained in all sub-frames; however, the WN word is contained only in the first sub-frame as described above. Thus, when receiving the navigation message so as to acquire the date information, it is desirable to fortunately receive the first sub-frame immediately after a satellite is captured. However, when the second sub-frame is received immediately after the satellite is captured, for example, reception of the radio waves from the satellite should be continued until the first sub-frame can be received next time. Therefore, acquisition of the date information to set the current date consumes significantly large power in comparison with acquisition of the time information. Especially when the GPS receiver apparatus uses a coin cell battery or other types of small battery (including rechargeable battery), continuous operation time of the apparatus is largely reduced.

BRIEF SUMMARY OF THE INVENTION

One object of the present invention is to provide a GPS receiver apparatus and an information acquisition method thereof which allows acquisition of specific information contained in a specific sub-frame of a navigation message with lower power consumption.

According to an embodiment of the present invention, a GPS receiver apparatus comprises a reception unit configured to receive a GPS signal transmitted from a GPS satellite and acquire a navigation message; a synchronization controller configured to control a reception frequency of the GPS signal and a frequency and a phase of a code of the GPS signal to ensure synchronization with the GPS signal, and generate a timing signal synchronized with a signal timing of the navigation message; a counter configured to count time based on the timing signal; and a power controller configured to start power supply to the reception unit and the synchronization controller in response to an acquisition request for a specific information contained in a specific sub-frame of the navigation message; stop the power supply to the reception unit after the reception unit acquires predetermined information contained in a sub-frame of the navigation message; determine whether or not the time counted by the counter arrives at a time point to start receiving a GPS signal for acquiring the specific information, the time point to start receiving determined based on the predetermined information; restart the power supply to the reception unit when the time counted by the counter arrives at the time point to start receiving; and stop the power supply to the reception unit and the synchronization controller after the reception unit acquires the specific information.

According to another embodiment of the present invention, an information acquisition method comprises starting reception operation for a GPS signal transmitted from a GPS satellite in response to an acquisition request for specific information contained in a specific sub-frame of a navigation message which is transmitted by the GPS signal; controlling a reception frequency of the GPS signal and a frequency and a phase of a code of the GPS signal to ensure synchronization with the GPS signal in response to start of the reception operation; generating a timing signal synchronized with signal timing of the navigation message; stopping the reception operation after predetermined information contained in a sub-frame of the navigation message is acquired, while continuing generation of the timing signal; determining whether or not time counted based on the timing signal arrives at a time point to start receiving a GPS signal for acquiring the specific information, the time point to start receiving determined based on the predetermined information; restarting the reception operation when the time counted arrives at the time point to start receiving; and stopping reception operation after the specific information is acquired.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
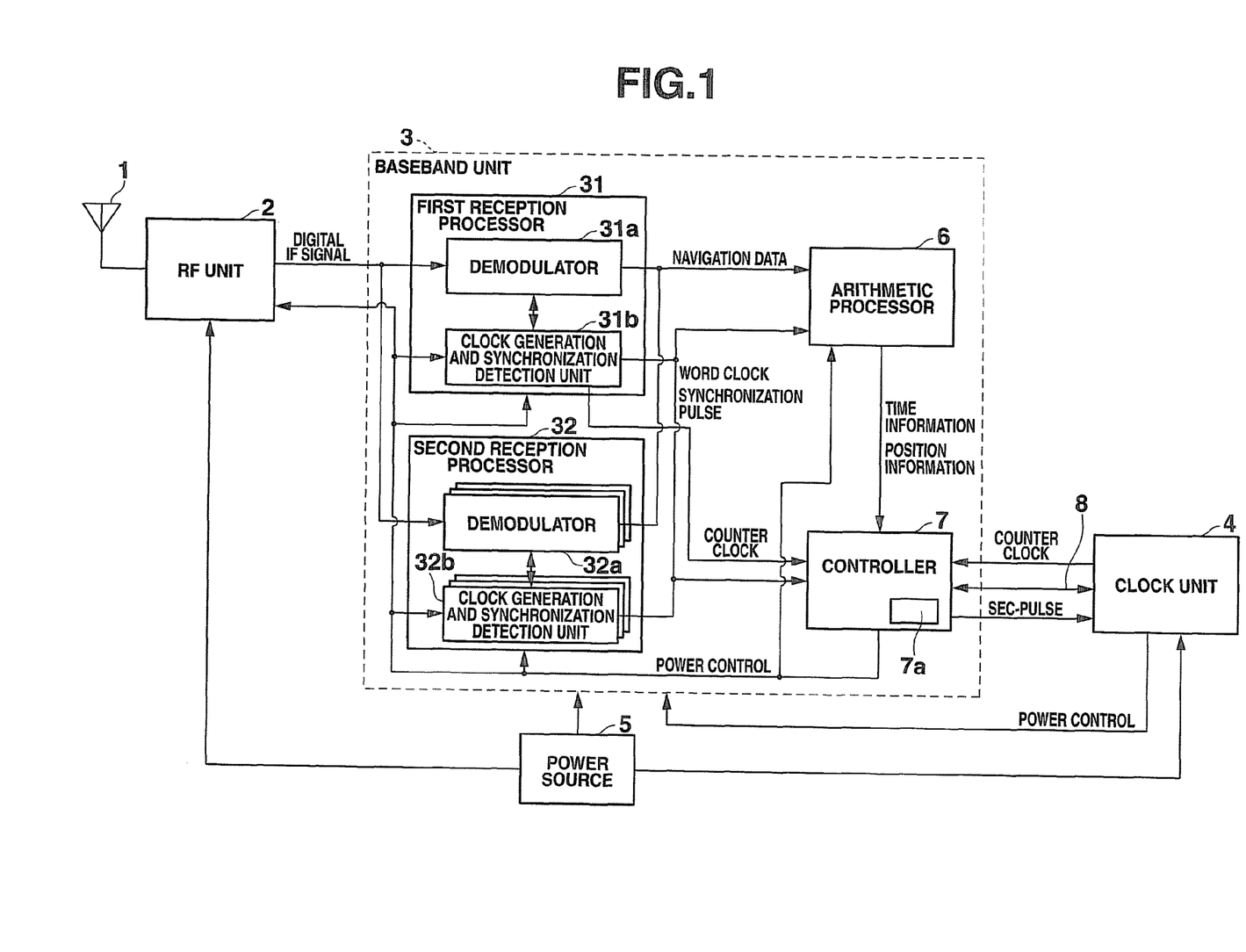
FIG. 1 is a block diagram showing a GPS receiver apparatus according to an embodiment of the present invention.

Hereinafter, an embodiment of the present invention will be described with reference to the accompanying drawings. FIG. 1 is a block diagram showing a configuration of a GPS receiver apparatus, according to the embodiment.

As shown in FIG. 1, the GPS receiver apparatus includes an antenna 1, an RF unit 2, a baseband unit 3, a clock unit 4 and a power source 5. The antenna 1 receives a radio wave from a GPS satellite and outputs a radio wave signal to the RF unit 2. The RF unit 2 includes a high-frequency amplifier circuit, a frequency converter circuit, and an analog-to-digital (A/D) converter circuit. The high-frequency amplifier circuit amplifies the radio wave signal inputting from the antenna 1, i.e., a GPS signal. The frequency converter circuit converts the high frequency signal after the amplification into an intermediate frequency signal. The A/D converter circuit converts the intermediate frequency signal to a digital signal. Thus, the RF unit 2 converts the inputting GPS signal to the digital intermediate frequency signal (IF signal) and outputs the digital IF signal to the baseband unit 3.

The baseband unit 3 includes a first reception processor 31, a second reception processor 32, an arithmetic processor 6 and a controller 7. The first reception processor 31 includes a pair of a demodulator 31a and a clock generation and synchronization detection unit 31b. The second reception processor 32 includes three pairs of a demodulator 32a and a clock generation and synchronization detection unit 32b. The baseband unit 3 can simultaneously process radio waves sent from four GPS satellites which are necessary to position measurement.

Each of the demodulators 31a and 32a converts the intermediate frequency signal into a baseband (zero IF) signal by frequency conversion processing, and then demodulates the baseband signal by back diffusion processing with a pseudo random number (PRN) code unique to a GPS satellite. Then, each of the demodulators 31a and 32a sequentially extracts navigation data and outputs the extracted data to the arithmetic processor 6. In the present embodiment, the RF unit 2 and the demodulator 31a of the first reception processor 31 function as a reception unit of the invention.

Each of the clock generation and synchronization detection units 31b and 32b includes a circuit for controlling a frequency (reception frequency) of the zero IF conversion processing executed by each of the demodulators 31a and 32a, a circuit for controlling a frequency and a phase of the PRN code used in the back diffusion processing. Each of the clock generation and synchronization detection units 31b and 32b brings the reception frequency, the unique PRN code, and the frequency and the phase of the PRN code to accord with a GPS signal sent from a GPS satellite to ensure synchronization with the GPS signal. Moreover, each of the clock generation and synchronization detection units 31b and 32b generates a synchronization pulse and a word clock, and outputs the generated synchronization pulse and word clock to the arithmetic processor 6 and the controller 7. The synchronization pulse is synchronized with signal timing (phase timing of the code) of the navigation message in the GPS signal, with which the synchronization is ensured. The word clock is generated every 0.6 seconds. The clock generation and synchronization detection circuit 31b of the first reception processor 31 functions as a synchronization controller of the present invention. The clock generation and synchronization detection unit 31b generates a counter clock signal (timing signal), which is in synchronization with signal timing of the navigation message, and outputs the generated signal to the controller 7.

The arithmetic processor 6 stores the data of the navigation message extracted by the demodulator 31a of the first reception processor 31, calculates the current time and date based on the time information and the date information contained in the navigation message, and outputs the calculated time and date to the controller 7. When measuring the current position, the arithmetic processor 6 calculates the current position of the apparatus based on the navigation messages, which are received from four GPS satellites and extracted by the demodulators 31a of the first reception processor 31 and demodulators 32a of the second reception processors 32. The calculation result is output to the controller 7.

The controller 7 includes a counter (register) 7a for counting time based on the counter clock sent from the clock generation and synchronization detection unit 31b and a counter clock signal sent from the clock unit 4. The controller 7 outputs a sec-pulse (second-pulse) signal for time correction to the clock unit 4 if necessary and outputs the current time and date and the current position calculated by the arithmetic processor 6 to the clock unit 4 via a serial communication line 8.

The clock unit 4 includes a clock circuit, a register for storing a date, operation switches, a display device including a small LCD, and a controller unit, which are not shown in the figure. The clock circuit measures the current time. The display device displays the current time and date, the current position and the result of the position measurement. The controlling unit controls whole operations of the apparatus including the elements of the clock unit 4 and the baseband unit 3. The controlling unit changes contents displayed by the display device in accordance with operation of the operation switches. The controlling unit executes setting or correction of the time and date. Moreover, the controller unit outputs a counter clock signal corresponding to a clock pulse generated by the clock circuit if necessary to the controller 7, and outputs an operation instruction to the controller 7 via the serial communication line 8.

The power source 5 includes a coin cell battery or other types of small battery (including rechargeable battery), a DC/DC converter and so on. The power source 5 supplies power to the RF unit 2, the baseband unit 3 and the clock unit 4 to work these units. Power supply from the power source 5 to the clock unit 4 is continued consistently, while power supply to the baseband unit 3 is controlled by the clock unit 4 and power supply to the elements of the baseband unit 3 and to the RF unit 2 is controlled by the controller 7. In the present embodiment, the controller 7 functions as a counter and a power controller of the present invention.

Figure 2:
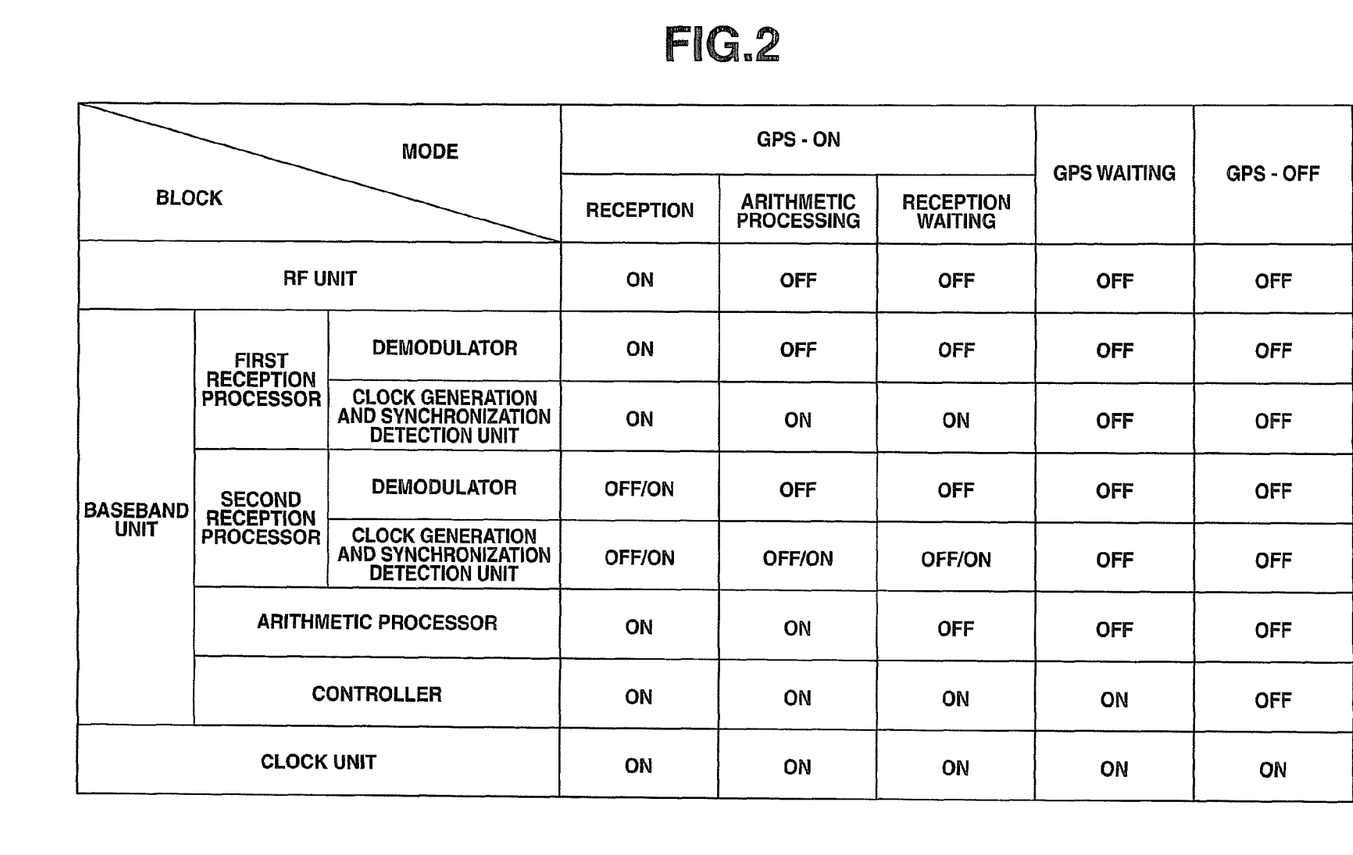
FIG. 2 is a table showing power control modes and corresponding on-off states of power supply.

FIG. 2 is a table showing power control modes to be automatically set in the GPS receiver apparatus and corresponding on-off states of power supply. As shown, three basic power control modes, i.e., "GPS-ON mode", "GPS waiting mode", and "GPS-OFF mode" are prepared. The "GPS-ON mode" includes three sub-modes, that is, "reception mode", "arithmetic processing mode", and "reception waiting mode". In the "GPS-ON mode", power supply to three demodulators 32*a* and three clock generation and synchronization detection units 32*b* of the second reception processor 32 are controlled to be set in either on-state or off-state as the case may be. When acquiring the date information (WN word), the off-state is set as described below. At the time of the position measurement, the on-state is set.

Hereinafter, the navigation message sent from a GPS satellite will be described. FIGS. 6A and 6B are views showing a format of the navigation message. Structure of a main frame transmitted every 30 seconds from satellites is shown in of FIG. 6A. The main frame includes five sub-frames, i.e., sub-frame #1 to sub-frame #5. Orbit information (ephemeris) and clock correction information of the originating satellite are described in the first to third sub-frames #1 to #3. All the satellites transmit the same fourth and fifth sub-frames #4 and #5. The contents of the sub-frames #4 and #5 include schematic orbit information (almanac) of all on-orbit GPS satellites (29 satellites are in service as of November 2007) and ionospheric correction information. Since such information has large data amount, the schematic orbit information and the ionospheric correction information are transferred in units of page. That is, data transferred in each of the sub-frames #4 and #5 is divided into pages 1 to 25. Respective pages include different contents, and are transferred sequentially. Transmission of all the pages requires 25 frames. Obtaining entire information of the navigation message takes 12 minutes and 30 seconds. The navigation message is repeatedly transmitted making the 25 frames as a master frame.

Figure 7:
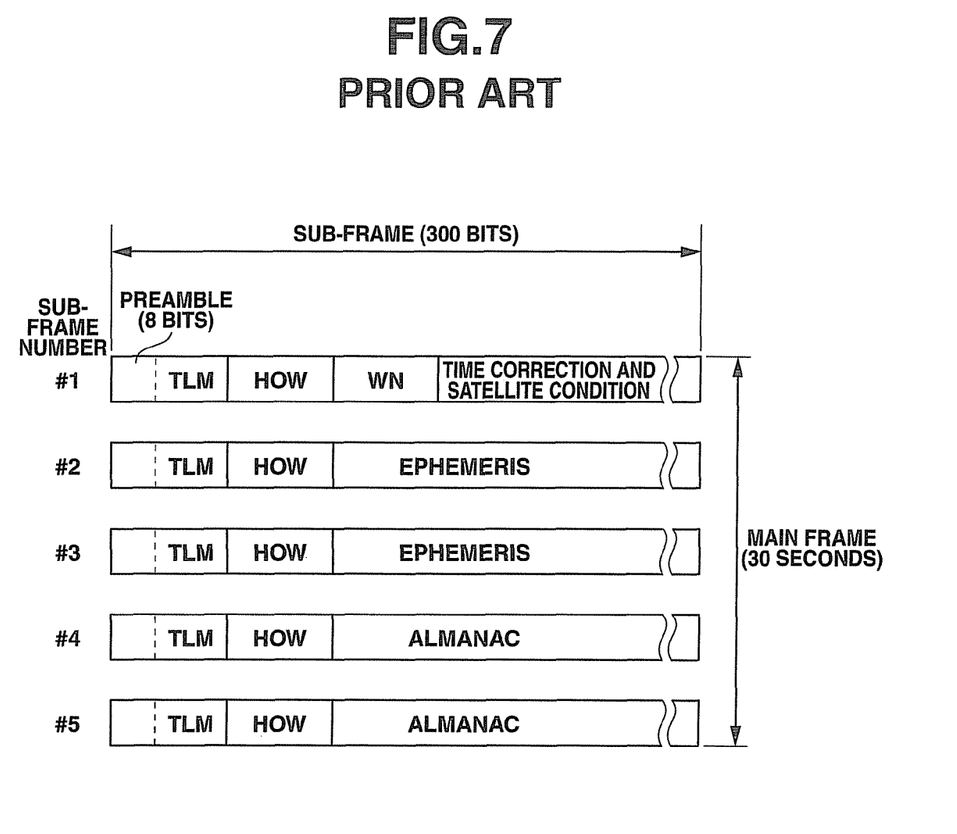
FIG. 7 is a view schematically showing a structure of a sub-frame contained in the navigation message.

As shown in FIG. 6B, each of the sub-frames can be divided into 10 words, and each of the words has 30 bits. Each word includes a data part having 24 bits and a parity check part having 6 bits. As shown in FIG. 7, a telemetry (TLM) word is described at the head of each sub-frame, and the HOW follows the TLM word. Data for making synchronization (preamble data) is described in the first 8 bits of the TLM word. In the HOW, which is subsequent to the TLM word, time of week (TOW) that is time information of the GPS signal and a sub-frame ID (identification information) that indicates what number sub-frame the sub-frame is, are described.

Described subsequently to the TLM word and HOW in the first sub-frame 1 are a week number (WN) word (date information), and thereafter, satellite clock correction information and satellite condition information. In each of the second and third sub-frames #2 and #3, description of ephemeris follows the description of the TLM word and the HOW. In the fourth sub-frame 4, data of almanac of satellites numbered 25-32, ionospheric information, and leap second information are described subsequently to the TLM word and the HOW. In the fifth sub-frame #5, description of data of almanac of satellites numbered 1-24 follows the description of the TLM word and the HOW.

The GPS satellites synchronously transmit sub-frames of the navigation message. When an HOW of any sub-frame is obtained out of a navigation message sent from any GPS satellite, what number sub-frame the sub-frame is can be identified; moreover, transmission timing can be predicted for the fourth and fifth sub-frames #4 and #5, in which data of specific pages are described, and also another sub-frame.

Figure 3:
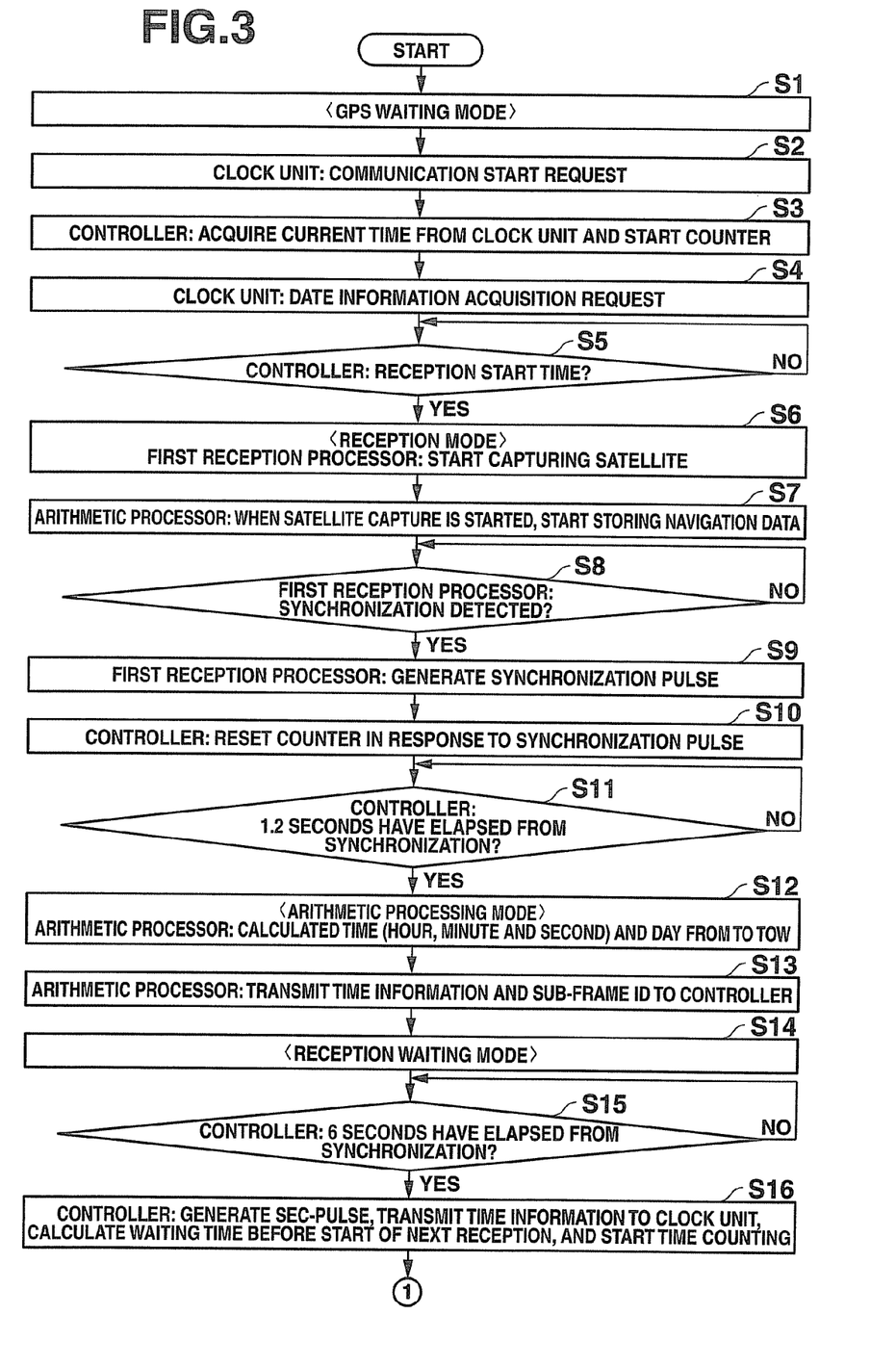
FIG. 3 is a flowchart showing a method for acquiring date information according to one embodiment of the GPS receiver apparatus.
Figure 4:
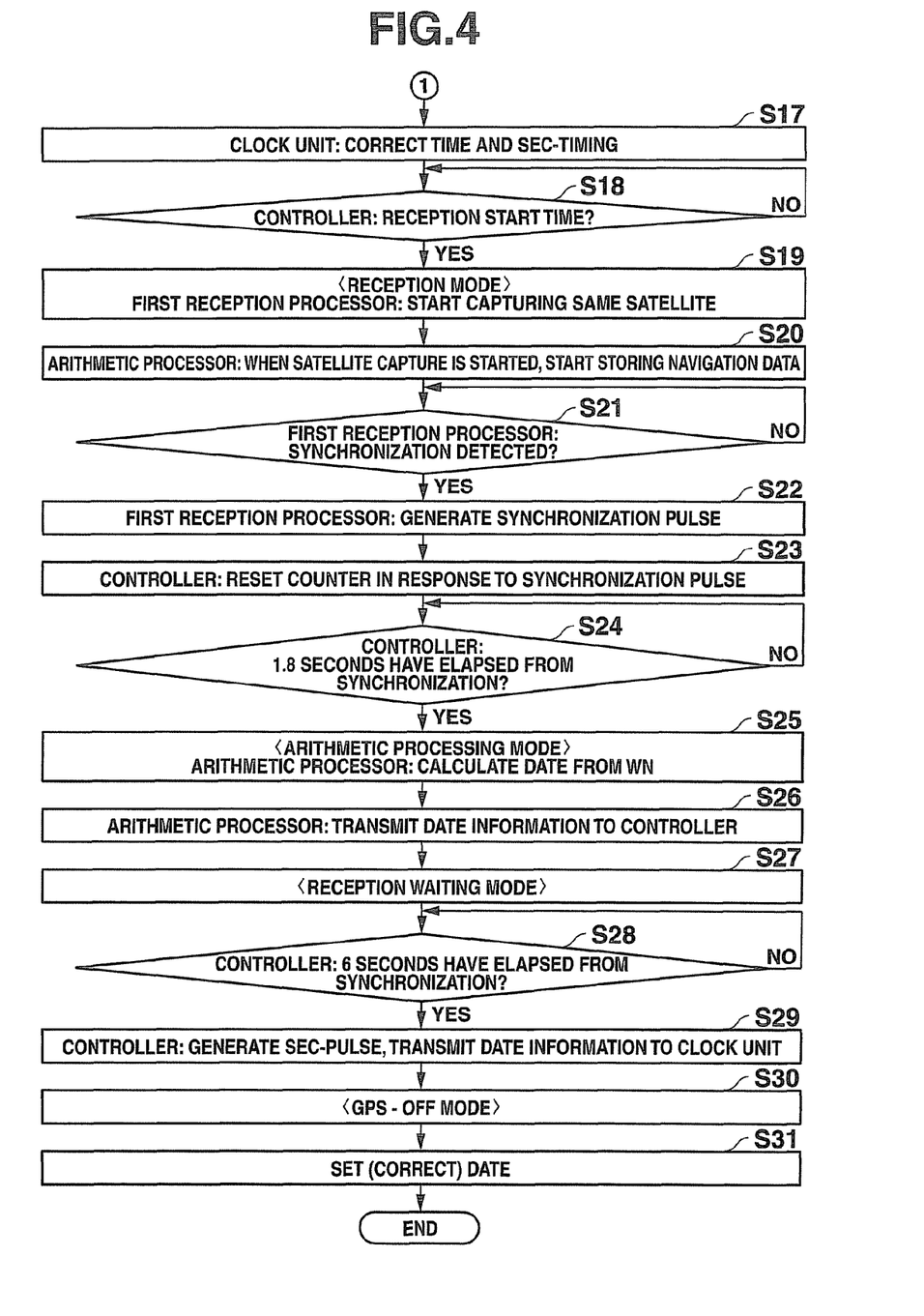
FIG. 4 is a flowchart following the flowchart of FIG. 3.

Next, an operation of the GPS receiver apparatus will be described. When a predefined operation button is pressed by the user prior to the first use after the battery is changed, the GPS receiver apparatus acquires date information as described below. FIGS. 3 and 4 are flowcharts showing the operation of the GPS receiver apparatus and FIG. 5 is a timing chart.

As shown in FIG. 3, first, the clock unit 4 causes power supply to the controller 7 in the baseband unit 3 to be started, then changes the basic power control mode from the GPS-OFF mode to the GPS waiting mode, and starts outputting the counter clock signal that is synchronized with the clock pulse generated by the clock circuit (not shown) to the controller 7 (step S1). Thereafter, the clock unit 4 requests the controller 7 to start communication (step S2).

In response, the controller 7 acquires the current time from the clock unit 4, and starts counting elapsed time using the counter clock which indicates the current time timing. Subsequently, the clock unit 4 requests the controller 7 to acquire date information (step S4). In response to the request, the controller 7 waits until predetermined reception start point comes (No in step S5). In the description herein, immediately after the power is reset, e.g., immediately after the battery is changed, the current time is set to "00:00" seconds. Only in such a case, waiting until the predetermined reception start point is not required, and waiting time is zero seconds.

Figure 5:
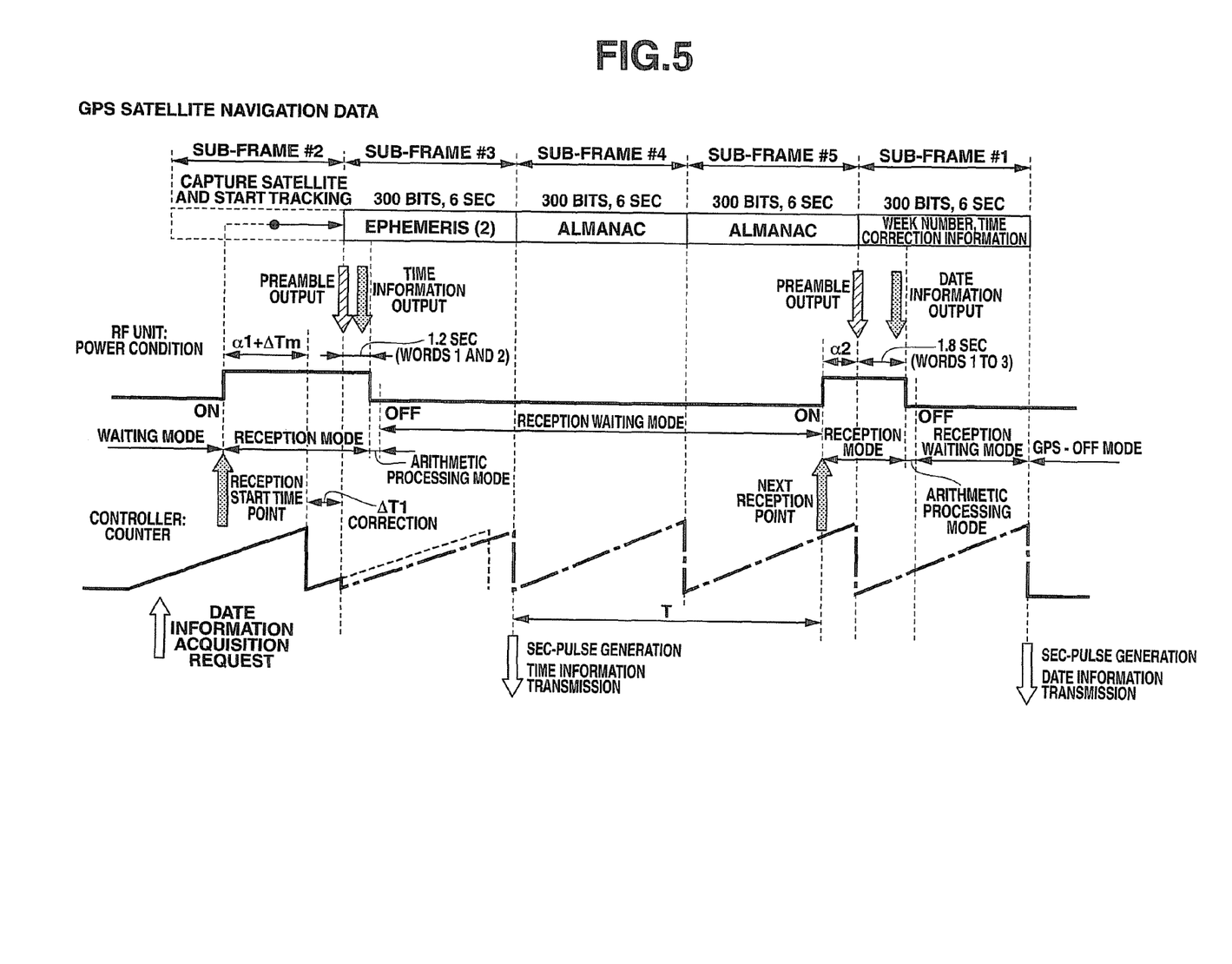
FIG. 5 is a timing chart showing an example of a date information acquisition operation according to one embodiment of the GPS receiver apparatus.

In the case other than immediately after the power reset, the reception start point is earlier by ($\alpha 1 + \Delta Tm$) or more than a transmission start point of a sub-frame to be received, as shown in FIG. 5. The period $\alpha 1$ represents time required for capturing an arbitrary satellite, and the period $\Delta Tm$ represents a maximum error based on accuracy of the clock unit 4. In FIG. 5, the elapsed time which the controller 7 counts is expressed in units of 6 seconds that is a transmission cycle of the sub-frames of the navigation message.

When the reception start point has come (YES in step S5), the controller 7 starts power supply to the RF unit 2, the first reception processor 31 and the arithmetic processor 6, and changes the power control mode to the reception mode that is a sub-mode of the GPS-ON mode to cause the first reception processor 31 to start capturing an arbitrary GPS satellite, that is, a reception operation (first reception operation) for a GPS signal sent from the arbitrary GPS satellite is started (step S6). Accordingly, the arithmetic processor 6 starts storing the navigation data (step S7).

When the first reception processor 31 detects synchronization with the navigation data, that is, when the synchronization with the GPS signal is established and preamble data (first 8 bits of a TLM word) of a sub-frame of the navigation message is acquired (YES in step S8), the clock generation and synchronization detection unit 31b generates a synchronization pulse and outputs the pulse to the arithmetic processor 6 and the controller 7 (step S9).

In response to the synchronization pulse, the controller 7 resets the counter 7a to correct an error ΔT1 existing in the clock timing of the clock unit 4 with respect to the clock timing of the GPS signal (see FIG. 5), and then, counting elapsed time from the reset is started using the counter clock signal output from the clock generation and synchronization detection unit 31b (step S10). That is, time counting is started based on the synchronization signal generated from the clock generation and synchronization detection unit 31b after the synchronization with the GPS signal is established. When it is immediately after the power is reset, the error ΔT1 may be larger than the maximum error ΔTm that stands on the accuracy of the clock unit 4.

In the present embodiment, a point at which the preamble data is received is determined as a point at which synchronization with the received signal is established, and the counter 7a is reset at the time. However, the counting timing of the counter 7a may be corrected on the basis of a transmission point of the navigation message, i.e., a time point corresponding to the head of the preamble data. In such a case, a period required for reception of the preamble data may be preset in the counter 7a at the time when the preamble data is detected.

When 1.2 seconds, that is a period required for receiving the first two words (TLM word and HOW) of the current sub-frame (second sub-frame #2 in the example of FIG. 5), has elapsed, i.e., when the time counted from the synchronization has become 1.2 seconds (YES in step S11), the controller 7 stops the power supply to the RF unit 2 and the demodulator 31a while continuing the power supply to the clock generation and synchronization detection unit 31b and changes the power control mode form the reception mode to the arithmetic processing mode. The arithmetic processor 6 calculates the current time (hour, minute and second) based on the time information (TOW) described in the HOW (step S12). The arithmetic processor 6 transmits the calculated current time information and the sub-frame ID (identification information) described in the HOW to the controller 7 (step S13). Then, the controller 7 immediately stops the power supply to the arithmetic processor 6 and changes the power control mode from the arithmetic processing mode to the reception waiting mode.

When the time counted from the synchronization has come to 6 seconds (YES in step S15), the controller 7 generates a sec-pulse for synchronization and outputs the sec-pulse and the calculated time information to the clock unit 4, determines what number sub-frame the current sub-frame is based on the sub-frame ID, calculates waiting time T before a next reception start point (see FIG. 5) based on the determination result, and starts time counting of the calculated waiting time T (step S16). As shown in FIG. 4, the clock unit 4 corrects sec-timing (second-timing) at a point, at which the sec-pulse is transmitted from the controller 7, and corrects the current time using the calculated time information transmitted from the controller 7 (step S17).

The next reception start point, to which the controller 7 refers when calculating the waiting time T in step S16, is a point at which next reception operation (second reception operation) for the first sub-frame #1 is started in order to acquire the WN word. As shown in FIG. 5, the next reception start point is earlier by a quite short period of α2 than a transmission start point of the first sub-frame #1. In the example of FIG. 5, because the current sub-frame is the third sub-frame #3, the waiting time T is obtained as "6*2−α2" seconds.

When the counted time has come to the waiting time T and the next reception start point comes (YES in step S18), the controller 7 immediately restarts the power supply to the RF unit 2 and the demodulator 31a, and sets the reception mode as the power control mode again, thereby causing the first reception processor 31 to capture the same GPS satellite as the previous capture (step S19). The arithmetic processor 6 starts storing the navigation data (step S20). Since the power supply to the clock generation and synchronization detection unit 31b of the first reception processor 31 is being continued, the first reception processor 31 immediately captures the same GPS satellite.

When the first reception processor 31 detects synchronization with the navigation data, that is, when the preamble data of the first sub-frame #1 of the navigation message is acquired (YES in step S21), the clock generation and synchronization detection unit 31b outputs a synchronization pulse to the arithmetic processor 6 and the controller 7 (step S22). In response to the synchronization pulse, the controller 7 resets the counter 7a and newly starts counting elapsed time (step S23).

When the time counted by the counter 7a from the new start of counting, i.e., the time counted from the synchronization has become 1.8 seconds that is required for receiving the WN word which is the third word in the first sub-frame #1 (YES in step S24), the controller 7 stops the power supply to the RF unit 2 and the demodulator 31a and changes the power control mode from the reception mode to the arithmetic processing mode, and thus, the arithmetic processor 6 calculates the current date based on the WN word (step S25). Thereafter, the arithmetic controller 6 transmits the calculated date to the controller 7 (step S26). The controller 7 immediately stops the power supply to the arithmetic processor 6 and changes the power control mode from the arithmetic processing mode to the reception waiting mode (step S27).

When the time counted by the counter 7a has come to 6 seconds (YES in step S28), the controller 7 generates a sec-pulse for synchronization and outputs the sec-pulse and the calculated date information to the clock unit 4 (step S29). In response, the clock unit 4 stops the power supply to the baseband unit 3 and changes the power control mode to the GPS-OFF mode (step S30). Then, the clock unit 4 corrects the sec-timing of the clock circuit based on the sec-pulse sent from the controller 7 and, based on the calculated date information, sets the current date in the register or corrects a date which have been stored in the register (step S31).

In execution of the above processing, when a GPS satellite cannot be captured by the first reception operation, i.e., when it is determined in step S8 of FIG. 3 that a GPS satellite cannot be captured within the predetermined period (α1+ΔTm), the reception operation will be terminated basically, though it is not illustrated in the figure. However, after it is determined based on the time counted by the counter 7a that an appropriate time period has elapsed, the first reception operation may be tried again.

As described above, when acquiring date information by the GPS receiver apparatus of the present embodiment, time information (TOW date in HOW) is acquired from a sub-frame of the navigation message received by the first reception operation, and date information (WN word) is acquired from the following first sub-frame #1 by the second reception operation. During a reception waiting period between a time point at which the time information is acquired and a time point at which reception of the first sub-frame is started, the power control mode is set in the reception waiting mode and the power supply to the RF unit 2 and the demodulator 31a of the first reception processor 31 is stopped. Therefore, the power consumption in the reception waiting period can be reduced.

Moreover, the power supply to the clock generation and the synchronization detection unit 31b is continued even in the reception waiting period; therefore, information on at least one of the reception frequency of the captured GPS satellite, the PRN code unique to the satellite, and the frequency and the phase of the PRN code is retained in the clock generation and the synchronization detection unit 31b, and the reception start point for the first sub-frame #1 is determined based on the counter clock signal from the clock generation and synchronization detection unit 31b to restart reception. Accordingly, a radio wave from the same satellite can be captured again in a short period of time, and the following first sub-frame #1 can be reliably received.

Thus, the date information existing only in the first sub-frame #1 of the navigation message and the time information can be obtained with lower power consumption. As a result, continuous operation time of the apparatus can be prolonged for when the coin cell battery or other types of small battery is used. Furthermore, to acquire the date information, a GPS signal is received using only the first reception processor 31 differently from the case of position measurement; therefore, the date information and the time information can be acquired with smaller power consumption.

In the above description, to acquire the date information, when a GPS satellite is captured by the first reception operation which is for acquiring the time information, it is assumed that the same satellite (same as the first reception operation) can be captured by the second reception operation which is for acquiring the date information. However, if the reception condition of radio waves is not good enough, the satellite may not be captured by the second reception operation. Thus, the embodiment may be modified as follows.

That is, when the satellite cannot be captured by the second reception operation, i.e., when a determination result in step S21 of FIG. 4 is "NO" even if predetermined time has elapsed, the power control mode is immediately changed to the reception waiting mode, and the power supply to the RF unit 2 and the demodulator 31a is stopped. The next reception start point is updated to a time point 30 seconds (transmission cycle of the main frame of the navigation message) later from the start point, and waiting time before the updated next reception start point is calculated. Thereafter, the processing from step S18 of FIG. 4 is repeated, and if the number of times of updating the next reception start point arrives at a predetermined number, the acquisition of the date information may be cancelled. Accordingly, even when the reception condition of radio waves from a GPS satellite is not good enough, the power consumption can be lowered.

In the present embodiment, description is given on the case where the time information (TOW data in HOW) and the date information (WN word) are acquired in response to acquisition request made with an operation of a predetermined operation button. Naturally, only the time information (TOW data in HOW) may be acquired. In such a case, after the first reception and arithmetic processing are finished, when the controller 7 transmits the sec-pulse and the time information to the clock unit 4 (step S16), the power supply to a GPS receiver section (RF unit 2 and baseband unit 3) is stopped.

In the case where the time information is not necessary and correction of the sec-timing is only required within the maximum error $\Delta Tm$ (up to ±3 seconds), after the first reception operation is started in response to the operation of the predetermined operation button, when preamble data of a sub-frame is acquired, i.e., when the clock generation and synchronization detection unit 31b generates a synchronization pulse, the power supply to the RF unit 2, the demodulator 31a, and the arithmetic processor 6 is immediately stopped, and the power control mode is changed from the reception mode to the reception waiting mode. Then the controller 7 generates only the sec-pulse after 6 seconds, and the clock unit 4 sets the GPS receiver section in the reception waiting mode and only the sec-timing is corrected.

In the present embodiment, the start point of the second reception operation to acquire the date information is set earlier by the short period α2 than the transmission start point of the first sub-frame, and the preamble data of the first sub-frame is acquired to correct the sec-timing of the clock circuit of the clock unit 4. However, the acquisition of the preamble data and the correction of the sec-timing may be omitted. That is, the start point of the second reception operation may be set within transmission of the first sub-frame #1 (but before the WN word).

In the present embodiment, the start point of the second reception operation (next reception start point) to acquire date information is determined based on a sub-frame ID of a sub-frame received at the time of starting reception of a GPS signal in the reception mode, which is firstly set as the power control mode. However, the next reception start point may be determined as follows.

For example, similarly to the present embodiment, in order to acquire TOW data from a sub-frame after the power control mode is firstly set in the reception mode to start receiving a GPS signal, the next reception start point may be determined from the TOW data. That is, time before a transmission start point of the following first sub-frame #1 may be calculated from the TOW data. The transmission start point indicates an exact minute (hh:mm:00) or an exact half-minute (hh:mm:30). The next reception start point may be set as a time point which is later by the calculated time or more from when synchronization with the GPS signal is established first and the clock generation and synchronization detection unit 31b generates a synchronization pulse.

In the present embodiment, explanation is given on the case where the second reception operation is performed with the aim of acquiring the WN word that is described in the first sub-frame of the navigation message. In addition, the embodiment may be applied to acquiring specific information described in another sub-frame. For example, information on a leap second is described in word 9 of page 18 of the sub-frame #4, and the embodiment may be applied to acquiring the information on the leap second. In such a case, a time point to start the second reception operation to acquire the information on the leap second may be determined as follows. When time of week (TOW) data is obtained by the first reception operation, the TOW of the current sub-frame can be defined as:

$$TOW=(a-1)/125+(b-1)/5+C$$

where "a"=current master frame number, "b"=current page number, and "C"=current sub-frame number. Therefore, what seconds later a reception start point for the following page 18 in the sub-frame #4 will come is calculated based on the TOW of the sub-frame received by the first reception operation and, thus, the time point to start the second reception operation can be determined.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A GPS receiver apparatus comprising:
a reception unit comprising a radio frequency unit and a demodulator, the reception unit configured to receive a GPS signal transmitted from a GPS satellite and acquire a navigation message;
a synchronization controller configured to control a reception frequency of the GPS signal and a frequency and a phase of a code of the GPS signal to ensure synchronization with the GPS signal, and generate a timing signal synchronized with a signal timing of the navigation message in the synchronized GPS signal;
a calculation processor configured to calculate a current time based on time information included in the navigation message acquired by the reception unit; and
a power controller configured to:
start power supply to the reception unit, the synchronization controller, and the calculation processor in response to an acquisition request for a specific information contained in a specific sub-frame of sub-frames of the navigation message;
stop the power supply to the reception unit while keeping the power supply to the synchronization controller and the calculation processor after the reception unit acquires the time information contained in one of the sub-frames of the navigation message;
stop the power supply to the calculation processor while keeping the power supply to the synchronization controller after the calculation processor calculates the current time; and
stop the power supply to the synchronization controller after a predetermined period has been elapsed from a time when the power supply to the calculation processor is stopped.

2. The GPS receiver apparatus according to claim 1, wherein the synchronization controller retains information on at least one of the reception frequency of the GPS signal for which the time information is acquired, and the frequency and the phase of the code of the GPS signal for which the time information is acquired, and acquires the specific information from the GPS signal, with which the synchronization is ensured, using the retained information when the power supply to the reception unit is restarted.

3. The GPS receiver apparatus according to claim 1, wherein
the reception unit comprises a high-frequency amplifier configured to amplify a radio wave signal from a GPS satellite, a frequency converter configured to convert an output signal from the high-frequency amplifier into an intermediate frequency signal, and demodulators configured to demodulate GPS signals from GPS satellites and to acquire navigation messages,
the synchronization controller comprises controller elements respectively associated with the demodulators, and
the power controller controls starting, stopping, and restarting the power supply to the high-frequency amplifier, the frequency converter, and a given pair of one of the demodulators and one of the controller elements, in response to the acquisition request for the specific information.

4. The GPS receiver apparatus according to claim 1, further comprising a clock unit configured to measure current time, and
when time provided from the clock unit comes to predetermined time, the power controller starts the power supply to the reception unit and the synchronization controller, and the calculation processor in response to the acquisition request for the specific information.

5. The GPS receiver apparatus according to claim 1, further comprising:
a clock unit configured to measure current time; and
a time correction unit configured to correct the current time based on the time information acquired by the reception unit.

6. An information acquisition method for receiving a GPS signal transmitted from a GPS satellite and acquiring specific information included in a specific sub-frame of sub-frames of a navigation message, the method comprising:
starting power supply to a reception unit, a synchronization controller, and a calculation processor and reception operation for the GPS signal in response to an acquisition request for the specific information;
controlling a reception frequency of the GPS signal and a frequency and a phase of a code of the GPS signal to ensure synchronization with the GPS signal in response to start of the reception operation;
generating a timing signal synchronized with signal timing of the navigation message in the synchronized GPS signal;
stopping a power supply to the reception unit while keeping the power supply to the synchronization controller and the calculation processor after time information contained in one of the sub-frames of the navigation message is acquired;
stopping the power supply to the calculation processor while keeping the power supply to the synchronization controller after the calculation processor calculates a current time; and
stopping reception operation of the GPS signal by stopping the power supply to the synchronization controller after a predetermined period has elapsed after a time when the power supply to the calculation processor is stopped.

* * * * *